No. 895,823. PATENTED AUG. 11, 1908.
J. L. WOODBRIDGE.
SYSTEM OF ELECTRICAL DISTRIBUTION.
APPLICATION FILED OCT. 2, 1907.
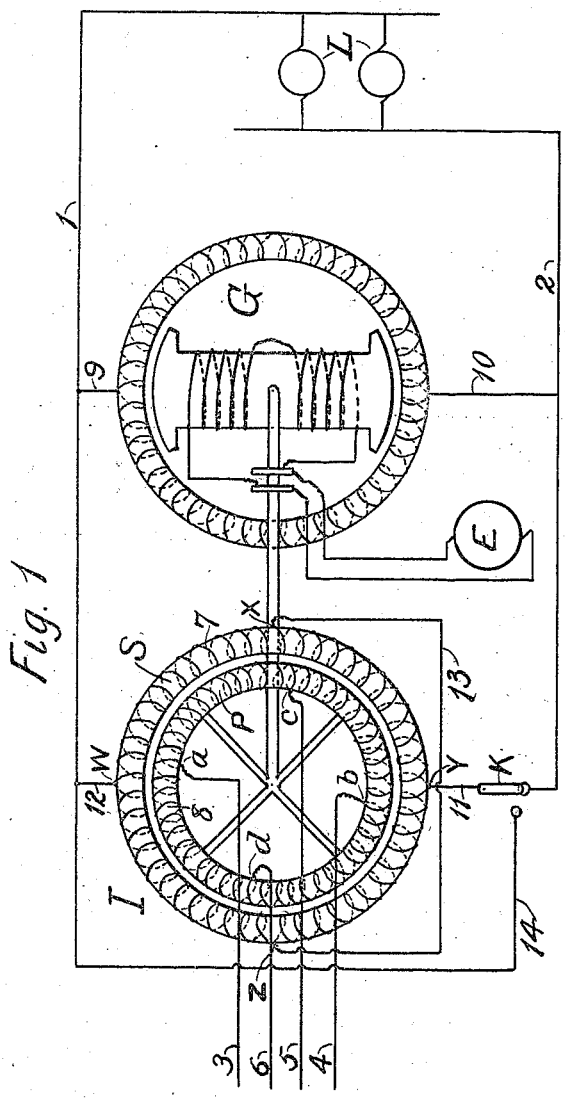
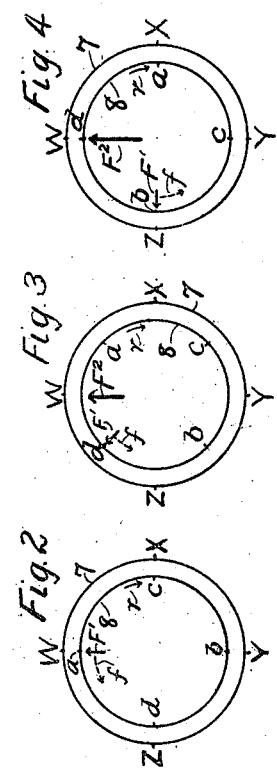
WITNESSES
INVENTOR
Joseph L. Woodbridge.
BY
ATTORNEY

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 895,823.  Specification of Letters Patent.  Patented Aug. 11, 1908.

Application filed October 2, 1907. Serial No. 395,516.

*To all whom it may concern:*

Be it known that I, JOSEPH LESTER WOODBRIDGE, a citizen of the United States, and resident of Philadelphia, in the county of Philadelphia and State of Pennsylvania, have invented a certain new and useful System of Electrical Distribution, of which the following is a specification.

My invention relates to those systems in which electrical energy is transformed from one frequency and number of phases to another and more particularly where polyphase electric currents are generated at one frequency and utilized in the form of single phase electric currents at a lower frequency.

One of the objects of my invention is to provide less expensive and more efficient means than have heretofore been used for transforming polyphase electric currents at one frequency into single phase electric currents at a lower frequency.

The general nature and scope of my invention will be more clearly understood by reference to the following explanation in connection with the accompanying drawings, in which Figure 1, represents a phase and frequency changer involving features of the invention, and Figs. 2, 3, and 4, are diagrammatic representations of the induction machine shown in Fig. 1, to which reference will be made in explaining its operation.

Referring to Fig. 1, G, is a single phase alternator here shown of the revolving field bi-polar type, the fields being excited by current from the exciter E, transmitted through collector rings on the shaft in the usual manner. This alternator may, however, be designed in accordance with any of the standard methods well known in the art, and need not be more particularly described here; it being understood of course that the number of poles of this alternator should correspond with the speed and frequency at which it is to be operated. This alternator is connected by the conductors 9 and 10, to the single phase consumption circuit 1, 2, supplying translating devices L.

Mounted on the shaft of the alternator is shown the rotor P, of an induction machine I. This rotor is provided with a winding 8, connected at four equidistant points *a, b, c, d*, to the four conductors 3, 4, 5, 6, respectively of a two-phase supply circuit. The rotor P, is free to revolve in inductive relation to the stator S, which latter is stationary and is provided with a winding 7. Two opposite points of this stator winding W and Y, are connected by means of the conductors 12, and 11, in parallel with the alternator G, to the consumption circuit 1, 2. Two other opposite points X and Z of the winding 7, displaced by an angle of 90° from the points W and Y, are short circuited by means of the low resistance conductor 13. A switch K, is shown interposed in the conductor 11, which may be used to disconnect this conductor from the conductor 2, of the consumption circuit and connect it by means of conductor 14, to the opposite point W, of the winding 7, thus short circuiting this winding across the points W and Y, for starting.

The operation of this apparatus is then as follows: With the switch K, in contact with conductor 14, the machine B, may be started from the polyphase supply circuit 3, 4, 5, 6, as an induction motor with short circuited armature in the usual manner. When, however, a speed of half that corresponding to synchronism with the supply circuit is attained, the switch K, may be opened, and at the instant of proper phase relation between the electro motive force of the induction machine I and the alternator G, the switch K, may be thrown into contact with conductor 2. The apparatus will then continue to operate at this speed corresponding to half the speed of synchronism and will develop an electro motive force across the conductors 1, 2, of the consumption circuit of half the frequency of the supply circuit. The load of the translating devices L, will be divided equally between the two machines. Of the total energy delivered by the supply circuit 3, 4, 5, 6, to the rotor P, one-half will be transformed inductively and delivered as single phase current from the winding 7, to the consumption circuit 1, 2, while the other half will be transformed into mechanical energy, which will drive the alternator G to furnish the output which this alternator delivers to the consumption circuit.

In order to explain more clearly the method of operation of the machine I, reference will now be made to Figs. 2, 3, and 4, in which the rotor winding 8, and the stator winding 7, are represented by concentric circles. The direction of rotation of the rotor is indicated by the full line arrow *r*. Fig. 2, represents the relative position of rotor and stator at the instant when the electro-motive force of the supply circuit applied at the points $a$, $b$, has reached its maximum value, while the electro-motive force applied at the points $c$, $d$, is passing through zero. During the rotation of the rotor a small current will flow between the points $a$, $b$, in phase with the applied electro-motive force, and similarly a small current will flow between the points $c$, $d$, in phase with the electromotive force applied to these points, and therefore 90° behind that across the points $a$, $b$. In the absence of output to the circuit 1, 2, these currents will be limited to small amounts, by the counter electro motive force set up, as will be shown later, in the winding 8. These two currents will produce a small field represented by the light arrow $F^1$, rotating in the direction of the dotted arrow $f$, opposite to the arrow $r$. This small rotating field in phase with the electro-motive forces applied at points $a$, $b$, and $c$, $d$, will produce electro-motive forces in the winding 8, 90° behind this field and therefore 90° behind the applied electro-motive forces. This same field will also produce a similar rotating electro-motive force in the winding 7. The effect of this small electro-motive force in the winding 8, will be to cause currents to flow into said winding from the supply circuit at points $a$, $b$, and $c$, $d$, and these currents will be in phase with the small electro-motive force above mentioned and will therefore be 90° behind the applied electro-motive force at the points $a$, $b$, and $c$, $d$. These currents will be of considerable magnitude, owing to the low resistance of the winding 8, and will constitute the true (wattless) magnetizing currents. At the instant illustrated in Fig. 2, the wattless magnetizing current between the points $a$, $b$, and the field produced by it, are both passing through zero value, and since the electro-motive force produced by such a field is in time quadrature, lagging, this electro-motive force will be exactly counter to that applied across $a$, $c$, and just enough less than the latter to permit the small energy component of current first mentioned to flow. For if the counter electro-motive force were less than this a greater energy component of current would flow and this would cause a greater wattless component, which would increase the counter electro-motive force sufficiently to establish equilibrium.

The wattless magnetizing current between the points $d$, $c$, at the instant illustrated by Fig. 2, is at its maximum value and would produce a field in the direction $d$, to $c$, 90° behind the field $F^1$, were it not for the current in the winding 7. As noted above the small field $F^1$ produces electro-motive forces in the winding 7, similar to those in 8, and since the points X and Z are connected by a conductor of low resistance, similar magnetizing currents will flow between the points X Z as between the points $c$, $d$, and these two will neutralize each other and no field will be produced in this direction.

Fig. 4, represents conditions corresponding to an instant one half of a primary cycle later than Fig. 2. The small field $F^1$ has made half a revolution with respect to the winding 8, but the winding 8, has been rotated one-quarter revolution, bringing the point $a$, opposite X. In this position, the electro-motive force produced across $d$, $c$, by the small field $F^1$ will cause the exciting current to flow from $d$, to $c$, and reach its maximum value at this instant and not being opposed by any other currents, this exciting current will produce the main alternating field flux represented by the heavy arrow $F^2$, which will reach its maximum value at this instant. The rotation of the winding 8, through this field will produce an electro-motive force across the points $a$, $b$, at right angles to the field, which will be counter to the applied electro-motive force at those points, and just enough less in value to permit the energy component of current to flow to produce the small field $F^1$.

Fig. 3, represents conditions corresponding to an instant intermediate between those of Figs. 2, and 4,—*i. e.* one quarter of a primary cycle later than the instant of Fig. 2. At this instant the electro-motive force applied to the points $d$, $c$, is a maximum, producing, by a small flow of energy current the small field $F^1$. This by its rotation in the direction of the dotted arrow produces a small electro-motive force across $a$, $b$, and causes a wattless magnetizing current to flow as above described. One component of this current is neutralized by the flow of current in the winding 7, between the points X and Z, while that component which is not thus neutralized produces the field $F^2$, which is of smaller value than that in Fig. 4, being produced by only a component of the magnetizing current instead of the whole. The value of $F^2$, in Fig. 3, will in fact correspond to the 45° point in a sine curve whose maximum (Fig. 4) is at 90° and the successive values of this field will follow the harmonic law. In Fig. 3, the counter electro-motive force between the points $d$ and $c$, has reached its maximum value and is produced partly by the rotation of the winding 8, through the field $F^2$ and partly by the rate of increase of the field $F^2$. The counter electro-motive force across $a$, $b$, is zero, since the effect of the rate of increase of the field $F^2$, is neutralized by the rotation of the winding 8.

Summarizing the above explanation it will be seen that so long as the rotation of the rotor is maintained at half synchronous speed, there will be maintained an alternating field across the points W, Y, which will develop in the winding 8, electro-motive forces counter to the applied electro-motive forces of the supply line, and an alternating electro-motive force in the winding 8, across the points W, Y, of half the primary frequency.

The following analysis will show that under the conditions illustrated by Figs. 2, 3, and 4, a speed of rotation of the rotor equal to half that of synchronism will be automatically maintained. During the half primary cycle elapsing between Figs. 2 and 4, the direction of the resultant wattless magnetizing current has shifted from maximum flow into the winding 8, at the point $c$, in Fig. 2, to maximum flow into said winding at point $d$, in Fig. 4, and during this time there was always one component of this current at right angles to the principal alternating field $F^2$, in the direction to produce by its reaction on said field a torque retarding the rotation. During the half cycle immediately preceding this, the action was exactly reversed, on account of the reversal of the field $F^2$ (which was passing through its zero value in Fig. 2), the torque tending to accelerate the rotation. These two results would therefore neutralize each other and produce equilibrium. If, however, the rotor should by any cause be slightly retarded, and fall behind the phase position illustrated in Figs. 2, 3, and 4, the point $c$, would not have quite reached the position shown in Fig. 2, at the instant the field $F^2$ is passing through zero, and the component of the magnetizing current which is at right angles to the field $F^2$ would reverse in direction just before the rotor reaches the position shown in Fig. 4. The duration of the retarding torque would then be somewhat less than a half cycle, and the duration of the accelerating torque somewhat greater, producing a net torque tending to accelerate the rotation, and bring the rotor back to its normal phase position. Similarly, if the rotor should be slightly accelerated by any cause, and run a little ahead of its normal phase position, there would immediately be developed a net torque tending to retard it. The rotation at half synchronous speed will therefore be maintained. This analysis applies only under conditions in which no current is allowed to flow in the winding 7, between the points W and Y. If current is allowed to flow between these points through an outside circuit re-actions will be set up similar to those in an ordinary induction motor, and the speed of rotation will tend to increase to approximate synchronism instead of half synchronism. It must also be borne in mind that the torque available for holding the rotor at half speed is limited to the reaction between the magnetizing current and the main field flux, so that if a force in excess of this should be applied to the rotor it would be thrown out of step. Under the conditions illustrated in Fig. 1, however, with the winding 7 connected at the points W and Y in parallel with the alternator G, re-actions producing marked stability are introduced. Under these conditions a slight retardation of the rotor P and the alternator field will have the effect of retarding the phase of the electro-motive force developed in the alternator, and at the same time advancing the phase of the electro-motive force developed at the points W and Y. This latter result will be produced because of the fact that the rotation of the magnetizing current in the winding 8, is opposite in direction to the mechanical rotation. This change of phase relation between the two machines will have the well known result of causing a transfer of current from the machine whose electro-motive force has been advanced into the machine whose electro-motive force has been retarded, that is, in this case from the induction machine I into the alternator G. The result of this will be to produce a strong torque tending to accelerate the rotation of the alternator field, and also a torque tending to accelerate the rotor of the induction machine I, since output of the current from the machine at the points W and Y will produce the accelerating re-actions of the induction motor. It will be seen, therefore, that the torque developed in both machines incident to a retardation of the revolving members will tend to bring them back to normal phase position. The opposite effect will of course be produced should a slight acceleration occur.

It remains to show that the load of the translating devices L will be equally divided between the two machines and will produce a balanced load on the two phases of the supply circuit 3, 4, 5 6. Assume first that a certain output of current is taken from the winding 7, at points W, Y, to supply a part of the load on the consumption circuit 1, 2. The effect of this output will be to cause an equivalent input to flow from the conductors 3, 4, into the winding 8. By referring to Fig. 2, it will be seen that this result must take place, for an output of current from W, Y, will tend to neutralize the magnetizing effect of the small input into the winding 8, at the points $a$, $b$, which produces the field $F^1$, and therefore, as already explained, reduce the counter electro-motive force at the points $a$, $b$, and this reduction will cause current to flow into $a$, $b$, from the supply circuit until the output from W, Y is neutralized. At the instant represented by Fig. 2, therefore, the entire energy output from W, Y will be supplied by an equivalent input from the supply circuit at the points $a$, $b$. At the instant represented by Fig. 3, the output from W, Y, is reduced in the ratio of sine 45°:1. The input at $a$, $b$, is now reduced to zero, while the input at $d$, $c$, is at its maximum, one component of which balances the output from W, Y, while the other is balanced by a flow of current between the points Z, X, in the short circuit connection. The latter, by its reaction on the main field flux $F^2$, produces an accelerating torque. In order that the maximum instantaneous value of the input at $d$, $c$, in Fig. 3, shall have a component balancing the output from W, Y, at that instant, that maximum input value must be equal to the maximum value of the latter output. It will be seen therefore, that when a certain output is taken from the points W, Y, twice as much energy will be delivered to the winding 8, from the supply circuit 3, 4, 5, 6, (equally divided between the two phases) one-half of which will be converted into mechanical work. If the output of the alternator G, is equal to the output taken from W, Y equilibrium will result. If the output of G, is less, the revolving members of the two machines will accelerate due to the surplus of mechanical energy developed in the rotor P, until the resulting change in phase position has equalized the outputs from the two, when equilibrium will be restored.

One of the advantages of the combination described above consists in the reduction in the capacity of machinery required to produce a given output. For example, if a standard motor generator set were utilized to deliver one thousand k. w. to the single phase line, two machines each having a capacity of 1000 k. w. would be required. With the combination described herein each machine need have a capacity of only 500 k. w. in order to deliver a total output of 1000 k. w. While it is true that the induction machine under these conditions would receive 1000 k. w. of electrical energy from the polyphase line, one-half of this energy is transformed inductively. If this machine were designed to operate as a standard induction motor at the same speed, its capacity would be reduced to 500 k. w.

While the above description refers to the transfer of the electric energy from the polyphase circuit to the single phase circuit, it will be understood that the apparatus described may be used for the transfer of energy in the opposite direction. The interconnected synchronous and induction machines may also be used as a motor for developing mechanical energy. When the switch K, is in the position shown in Fig. 1, a speed corresponding to one-half the speed of synchronism with the polyphase circuit will be maintained. When the switch K, is thrown into contact with conductor 14, a speed of approximate synchronism with the polyphase circuit will be maintained, the machine I, running as an ordinary induction motor, and the machine G being idle.

What I claim is:

1. In combination a polyphase alternating current circuit, a single phase alternating current circuit, a synchronous dynamo-electric machine connected to the single phase circuit, an induction machine provided with stator and rotor windings, whereof one is connected to the polyphase circuit, and the other is connected at appropriate points to the single phase circuit; means for short circuiting the latter winding across other points displaced from the first mentioned points; and mechanical means for maintaining a fixed relation of rotation between the two machines.

2. In combination a synchronous dynamo electric machine and mechanically connected thereto an induction machine provided with rotor and stator windings, whereof one is adapted for connection to a polyphase circuit; means for connecting appropriate points of the other of said windings to the synchronous machine, and an independent circuit connecting other points in said winding.

3. In combination a polyphase alternating current circuit, a single phase alternating current circuit, a synchronous dynamo-electric machine connected to the single phase circuit, an induction machine provided with stator and rotor windings, whereof one is connected to the polyphase circuit and the other is connected at appropriate points to the single phase circuit; means for short circuiting the latter winding across other points displaced from the first mentioned points; and means for maintaining a fixed relation of rotation between the two machines.

4. A polyphase alternating current circuit, a single phase alternating current circuit, an induction machine provided with stator and rotor and their respective windings; connections from one of said windings to the polyphase circuit; means for connecting appropriate points in the other winding to the single phase circuit; a circuit of low resistance connecting other points of the last mentioned winding; and dynamo-electric apparatus adapted to interchangeably transform mechanical and electrical energy, said apparatus connected electrically to the single phase circuit and mechanically to the rotor of said induction machine.

5. In combination a synchronous dynamo-electric machine, an induction machine provided with rotor and stator windings, whereof one is adapted for connection to a polyphase circuit; means for connecting appropriate points of the other of said windings to the synchronous machine; an independent circuit connecting other points in the last mentioned winding; and means for transferring between the two machines mechanical energy developed in either.

In testimony whereof I have hereunto signed my name.

JOSEPH LESTER WOODBRIDGE.

Witnesses:
W. J. JACKSON,
FRANK E. FRENCH.